United States Patent [19]

Rogers, Jr.

[11] Patent Number: 5,022,186

[45] Date of Patent: * Jun. 11, 1991

[54] TIRE UNIFORMITY CORRECTION

[75] Inventor: Clarence L. Rogers Jr., Hartville, Ohio

[73] Assignee: The Uniroyal Goodrich Tire Company, Akron, Ohio

[*] Notice: The portion of the term of this patent subsequent to Jun. 11, 2004 has been disclaimed.

[21] Appl. No.: 796,676

[22] Filed: Nov. 8, 1985

[51] Int. Cl.⁵ .............................................. B24B 49/00
[52] U.S. Cl. ............................... 51/165 R; 51/106 R; 51/165.92; 51/281 R; 51/DIG. 33
[58] Field of Search ......... 51/165 R, DIG. 33, 106 R, 51/165.92, 281 R; 73/146, 146.2

[56] References Cited

U.S. PATENT DOCUMENTS

| | | | |
|---|---|---|---|
| 3,574,973 | 4/1971 | Rader | 51/165 |
| 3,725,163 | 4/1973 | Hofelt, Jr. | 156/64 |
| 4,016,020 | 4/1977 | Ongaro | 51/106 R |
| 4,047,338 | 9/1977 | Gormish et al. | 51/106 R |
| 4,128,969 | 12/1978 | Gormish et al. | 51/106 |
| 4,458,451 | 7/1984 | Rogers et al. | 51/165 R |

OTHER PUBLICATIONS

Ridge Formation During the Abrasion of Elastomers A. K. Bhowmick.
Friction and Abrasion of Rubber, A. Schallamach.

Primary Examiner—Maurina Rachuba
Attorney, Agent, or Firm—Alan A. Csontos, Greg Strugalski

[57] ABSTRACT

An apparatus and method for reducing radial force variations of pneumatic tires by removing rubber in selected areas of the tire wherein a tire is rotated at a suitable high speed for nongrinding functions such as warmup and testing and the tire is rotated at a suitable slow speed for removing rubber from the selected areas of the tire. A tire with distinct suitable texture features was unexpectantly found using an apparatus and method.

17 Claims, 9 Drawing Sheets

TIRE UNIFORMITY CORRECTION

BACKGROUND OF THE INVENTION

This invention relates to pneumatic tires and particularly to the processing of the tire to assure dynamic uniformity of the tire. More particularly, the invention relates to an apparatus and method for reducing radial force variations of the tire and a tire produced therefrom.

In pneumatic tires, components such as beads, inner liner, tread and sheets or plies of rubberized cords utilized in the carcass and belts are segmentally assembled. Such assemblage can result in a structural nonuniformities in pneumatic tires which can cause variations in force which a rolling tire generates in a direction perpendicular to the surface, such as a roadway, which the tire rolls on. Such variations are generally referred to as radial force variations. Radial force variations are anomalies in a tire which result from "hard" and/or "soft" spots in the tire due to structural nonuniformities such as inconsistent wall thickness, ply turn-up variations, bead set, ply arrangement and other deviations. When the radial force variations exceed an acceptable level, the ride of the vehicle can be adversely affected.

Excessive radial force variations are generally corrected on tire uniformity correction apparatus, described, for example, in U.S. Pat. Nos. 3,574,973, 3,725,163 and 4,458,451, where the radial force variations are detected, measured and corrected by removing selected portions of tread rubber by a pair of grinders, one located at each shoulder of the tire which effects a reduction in radial force variations to an acceptable level.

In typical tire uniformity correction apparatus, a tire is mounted on a rotatable axle and the tire is inflated and rotated against a loadwheel wherein the tire is loaded to a predetermined load against the loadwheel during about 2 revolutions and thereafter rotated under full load for 4 revolutions. These 6 revolutions are generally referred to as "warmup" time and is performed to relieve any "set" in the tire that may have occurred during storage. Detection for excessive radial force variations is started after the warmup is completed.

Radial force variations are transmitted to the loadwheel where the radial force variations are sensed by transducers, such as load cells, wherefrom electrical signals representing the magnitude of the measured radial force variations are generated and sent to a computer. The measurement of radial force variations is generally performed in from one to three revolutions of the tire on the spindle in the above described tire uniformity apparatus depending on the electrical circuitry design of the apparatus. The signals are sorted and compared to predetermined lower and upper limits of correctable radial force variations wherein the computer makes a grind or no-grind decision by comparing the actual measured radial force variations to the lower and upper limits. If the measured radial force variations do not exceed the lower limit, no grinding is performed. If the measured radial force variations exceed the upper limit, the radial force variations are considered noncorrectable and no grinding is done and the tire is also removed from the apparatus.

Grind instructions are generated when the measured radial force variations exceed the lower limit and are less than the upper limit. A pair of hydraulic cylinders are actuated wherein each hydraulic cylinder moves a corresponding rotary grinder to the shoulder of the tire. The grinders remove rubber from selected areas of the shoulders to reduce the radial force variations to an acceptable magnitude such as at or below the lower limit.

The time required to grind a tire is dependent on the amount of rubber to be removed from the tire to reduce the undesirable radial force variations to an acceptable level and the rotational speed of the tire which is typically set at a constant speed of about 60 rpm. The amount of rubber to be removed in a given time, generally termed the rubber removal rate, is dependent on the type of treads on the tires being processed (e.g., rib type, large block, or small block). The grinding on a small or large block tread type tire is limited by what is called the heel and toe effect wherein the grinding wheel pushes the rubber ahead of it resulting in more rubber being removed from the leading edge of the small block than is removed from the trailing edge. The rubber removal rate for a small block tread type tire has been found to be limited to about ½ pound of radial force variation per revolution at 60 rpm. It has been found that for a large block tread type tire, about 1 pound of radial force variation per revolution at 60 rpm can be removed and a rib tread type tire can allow for about 2 pounds of radial force variation removal per revolution at 60 rpm.

Selected portions of tread rubber are removed when a rotating grinding wheel contacts and removes rubber from the surface of the tread over a predetermined angle which is generally less than 180° of the tread surface. Each such occurrence of such rubber removal is generally called a pass. The number of grinding passes to reduce excess radial force variations from a tire generally are from 1 to about 45 passes. Attempts to improve productivity of grinding a tire by increasing the rotational speed of the tire results in more grinding force applied to the tire thereby reducing the amount of rubber that can be removed from the tire per pass wherein the number of grinding passes are increased.

Grinding affects the appearance of a tire tread when undesirable radial force variations are removed and a tire with unacceptable appearance is produced which may be reclassified to a blemish or scrap tire or may need further processing. The appearance of a tire tread can be evaluated in terms of texture which is determined by visual inspection of a tire by a person trained in such techniques. In particular, the person inspects a tire for grinding flaws on the ground surface such as ridges that extend perpendicular to the centerplane of the tire. If the tire does not meet the inspector's visual criteria, the tire generally requires further processing by grinding the tire over the ground surface with a finer grit stone at lower force removal rates to achieve the desired texture.

Such ridges found in the ground surface of a tread have been the subject of such papers as "Friction and Abrasion", Rubber Chemistry and Technology, 41, 209 (1968) by A. Schallamach, and the ridges have been described as wavy ridges as discussed in an article "Ridge Formation During The Abrasion Of Elastomers", Rubber Chemistry and Technology, 55, 1055 (1982) by A. K. Bhowmick. Such ridges characterize an undesirable effect of grinding a tire wherefrom a tire may appear to be a blemished or scrap tire.

Another grinding effect affecting the appearance of block tread type tire when undesirable radial force variations are removed occurs when the grinding removes excessive rubber from an initial portion of the block which the grinding stone contact, generally termed the leading edge of the block wherein the molded radius of the leading edge is transformed to a larger radius. This rounded leading edge is generally measured as the length of the excessive ground portion of a partially deformed block element measured from the edge of the block. Generally, the maximum allowable length is less than about 0.125 inch wherein if the rounded leading edge exceeds the maximum length, the tire generally requires reprocessing until the rounded leading edge is acceptable. When a rubber block tread type tire is cut to examine a leading edge, a rounded leading edge can be characterized as having a radius of curvature greater than the radius of curvature of the molded edge.

Another grinding effect is reversion which is evidenced by white areas of the ground portion as seen under a microscope. Reversion is generally defined as the rubber exhibiting soft tacky stage once the rubber has been cured to a tack free tough stage characteristic of fully vulcanized rubber. Once rubber has begun to revert, many of its desirable properties are lost. Reversion can occur because of excess heat applied to a grind patch by a conventional grinding hereinbefore described. It has been found that polishing the tire after grinding the tire can remove the visual affects of reversion.

It has been found that the continual grinding of a small block tread type tire for about one minute to remove about 30 pounds of radial force variation increases the probability of blemishing a tire due to appearance. The industry is continually seeking methods to improve the appearance of tires that require grinding.

The grinding of the tire occurs in a patch which is generally less than 50% of the circumferential length of the tire whereby actual grinding occurs for less than 50% of the actual time of processing the tire for tire uniformity. It is desirable to diminish the nongrinding time and to increase the amount of rubber that can be removed from the tire without adversely affecting the appearance of the tire.

SUMMARY OF THE INVENTION

It is an object of the present invention to provide an improved process for reducing radial force variations in pneumatic tires. It is a further object of the present invention to provide an improved apparatus for reducing radial force variations in pneumatic tires. It is another object of the present invention to provide a tire wherein selected portions of the tread rubber have a ground portion and the appearance of the ground portion is improved over appearances of ground portions of conventionally ground tires.

The object of an improved tire and other objects and advantages are achieved by the method and apparatus of the present invention wherein a pneumatic tire is rotated against a predetermined load wherefrom radial force variations of the tire are detected and measured by means such as transducers. The magnitude of the measured radial force variations is compared with a predetermined range wherein when the magnitude of the measured radial force variations is within a predetermined range, a means for rotating said pneumatic tire at various speeds reduces the speed of the tire. After the speed of the rotating tire is reduced, rubber is removed from selected areas of the tire by a means to remove rubber wherein undesirable radial force variations are reduced.

The apparatus and method of the present invention to reduce radial force variations allows for rotating the tire during rubber nonremoval activity at a higher speed than when actual rubber removal occurs. Also, reduced rotating speed during rubber removal allows for increased amounts of rubber to be removed without adversely affecting the appearance the tire.

The tire of the present invention includes a tread surface which has a ground surface which includes mounds of rubber wherein each mound of rubber has a rounded edge.

DETAILED DESCRIPTION

Figure 1:
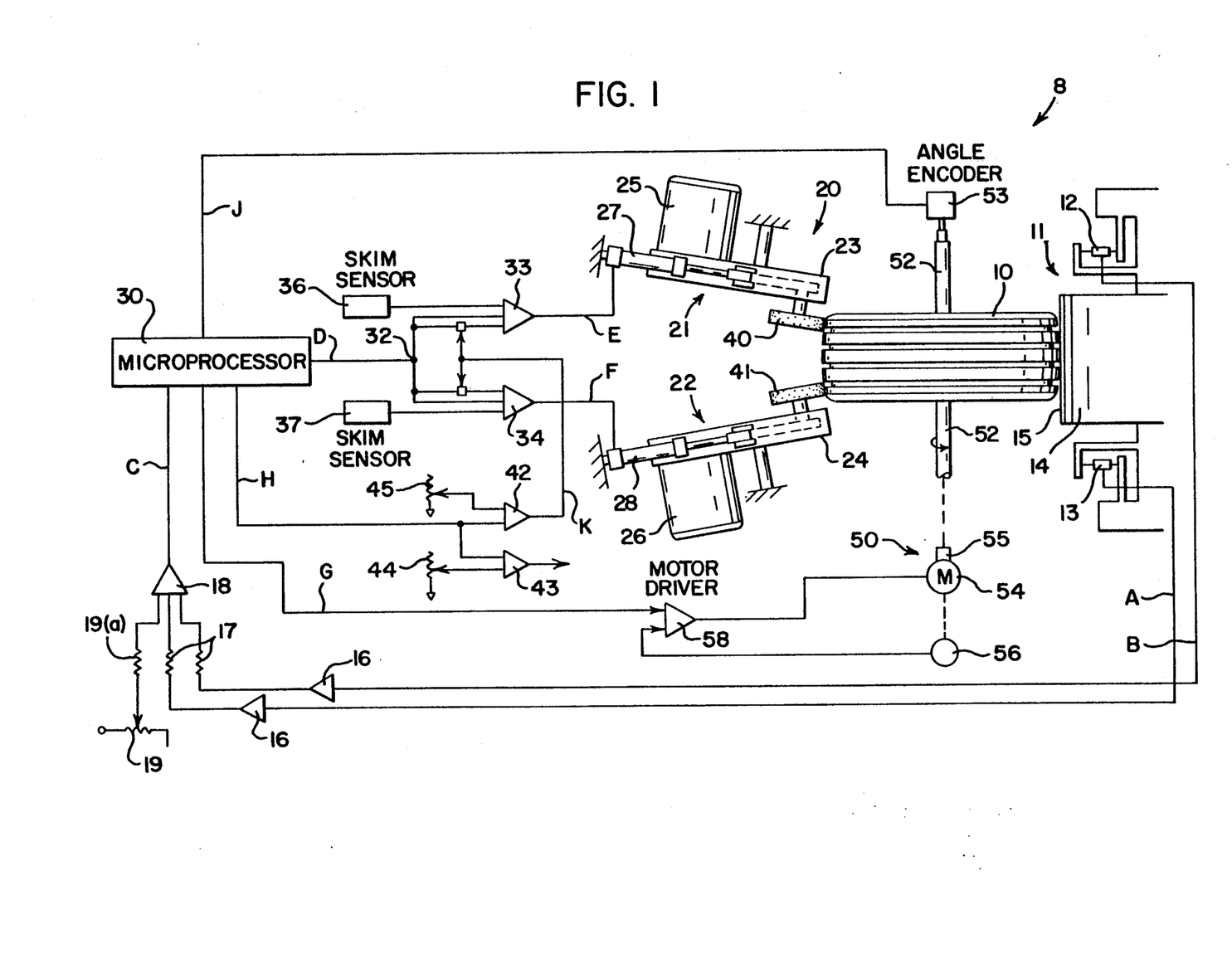
FIG. 1 is a schematic diagram illustrating a tire uniformity correction machine for detecting, measuring and reducing, radial force variations in a pneumatic tire.

In FIG. 1 there is shown by schematic representation a tire uniformity apparatus 8 which operates to reduce radial force variations of a pneumatic tire 10. The tire uniformity apparatus 8 includes a means 11 to detect and measure radial force variations, a means 20 to remove rubber from the pneumatic tire 10, a microprocessor 30 and a means 50 for rotating the pneumatic tire 10 at various speeds.

The means 50 for rotating the tire 10 at various speeds includes a rim, such as a solid or split rim (not shown) or an ordinary car upon which the tire 10 is mounted wherein the rim is carried on a spindle 52 turned by a variable-speed rotary drive means 54. The drive means 54 is capable of rotating the tire at various speeds as between about 1 rpm and about 200 rpm. Preferably, the rubber is being removed from the tire to reduce radial force variations which is hereafter referred to as grind speed. The grind speed is determined by the type of tire wherein a small block tread type tire is ground at a tire rotating speed of between about 1 and about 5 rpm; a large block tread type tire is ground at a tire rotating speed of between about 5 and about 10 rpm; and a rib tread type tire is ground at a tire rotating speed of between about 10 and about 30 rpm.

In addition, the drive means 54 is capable of rotating the tire at a second speed which is greater than the first speed during the time when the tire is not being ground or, referenced herein as nongrind speed wherein the second speed can be between about 30 rpm and about 200 rpm. Preferably, in the present invention, the tire is rotated at about 100 rpm during nongrind time. It is conceivable that the tire could be rotated up to the resonance speed of the tire which is about 600 rpm to obtain acceptable test data. At speeds greater than resonance speed of the tire, suitable test data measuring radial force variations is not obtainable due to changes within the tire. Speeds approaching the reasonance speed of a tire (i.e., between 200 and 600 rpm) require sophisticated equipment which is generally not used in a tire uniformity apparatus.

A desirable additional feature of the drive means 54 is the capacity to change speed from the grind speed to the nongrind speed and from the nongrind speed to the grind speed in less than one second and more preferably in less than about ¼ second.

The grind speed and nongrind speed can be achieved by a drive means such as an AC motor with suitable gearing and clutching or similar device or can be achieved with a DC motor. However, it has been found that a low inertia D.C. motor and a 10:1 gear reducer 55 can achieve the various rotating speeds as well as change speeds of the rotating tire from about 100 rpm to about 1 rpm or from about 1 rpm to about 100 rpm in less than about ¼ second wherein the low inertia D.C. motor has a horsepower rating of about 5 horsepower. The low inertia D.C. motor includes a motor shaft (not shown) to which is attached a tachometer 56 which provides feedback to a motor controller 58 to control the speed of the motor. The precise speed control of the low inertia D.C. motor is facilitated by the motor controller 58 and more preferably a single-phase adjustable speed regenerative D.C. motor controller such as a Fincor ® series 2200 is used.

The means 11 to detect and measure radial force variations of the tire 10 includes load cells 12, 13 and a loadwheel 14 which has a cylindrical surface 15 upon which the tire 10 rotates imparting rotation to the loadwheel 14 which is adapted for free rotation about a non-rotating axle (not shown) spaced but parallel with the axis of rotation of the tire 10. The axle upon which the load wheel 14 rotates is adjustably mounted so that the loadwheel 14 may be positioned closer to or further from the axis of rotation of the tire 10. In this manner, a predetermined deflecting load may be set up against the tire 10 by the surface 15 of the loadwheel 14.

Operatively coupled to the loadwheel 14 are the two load cells 12, 13 which contain sensors such as strain gauges which measure the force exerted on the loadwheel 14 in the radial directions by the rotating tire and convert the radial force variations measurements to an electrical signal such as voltage level signals which are fed via lines A and B through instrumental amplifiers 16, and series resistors 17 before being combined in a summer amplifier 18. In addition to the inputs from lines A and B, the summer amplifier receives a predetermined load signal command from a load potentiometer 19 which is passed through a resistor 19(a) into the summer amplifier 18. The output from the summer amplifier 18 passes through one line C into a microprocessor 30.

The microprocessor 30 receives, processes and interprets the radial force variation signal, and stores the interpreted information in its memory. Later, the microprocessor 30 produces a control signal for controlling the grinding of the tire as a function of the radial force variation signal. The microprocessor will be described in greater detail in the operation of the tire uniformity apparatus. Although a microprocessor is used in the preferred embodiment of the present invention, it is recognized that other electronic packages for determining the output of the grind comparator form such as described in U.S. Pat. No. 4,458,451 can be used.

The microprocessor 30 outputs the control signal on line D wherein the control signal is sent to a nodal point 32 wherein the signal is divided into two control signals. Each of the control signals is fed into a servo amplifier 33, 34 wherein each control signal is summed with a signal from a skim sensor 36, 37 which measures and controls the nongrinding distance between the grinding wheel 40, 41 and the shoulders of the tire 10.

A signal from the microprocessor 30 passes to a grind classifier 42 through line H and a scrap classifier 43. A scrap limit potentiometer 44 provides a preselected value for a maximum limit detection so that if the microprocessor signal, exceeds the preselected value then no grinding will occur and the tire will be transferred from the tire uniformity machine 8. The grind classifier 39 compares the signal with a voltage from a grind limit potentiometer 45 and this determines whether additional grinding is required. If no additional grinding is required, the signal of line K is summed in the servo amplifier 33, 34 effecting retraction of the grinders. The signal summed in the servo amplifier 33, 34 is converted to a hydraulic control signal which is passed through lines E, F to the means 20 to remove rubber which in the present invention is two grinders 21, 22. The two grinders 21, 22 include frames 23, 24 which support electric motors 25, 26, hydraulic systems 27, 28 and grinding wheels 40, 41. The frames 23, 24 are pivotably mounted on the apparatus 8 with suitable devices such as pins (not shown) to allow for each grinder 21, 22 to pivot towards or away from the shoulder of the tire 10.

The microprocessor has an input signal from the position encoder 53 along a line J wherein the position encoder is suitably attached to the spindle 52. The signal from the position encoder 53 to the microprocessor 30 coordinates the location of the grinding of the tire taking into account the angle difference between the loadwheel 14 and the grinders 21, 22 and sufficient lead in time when required.

The method of the present invention involves rotating the pneumatic tires at a grind speed and a nongrind speed wherein operations such as loading, warmup and testing can be done as quickly as possible at a nongrind speed of about 100 rpm wherefrom the rotating tire is slowed to a grind speed in less than ¼ second. The actual rpm for grind speed is determined based on the design of the tire wherein a small block tire has a grind speed in the range of about 1 rpm to about 10 rpm and preferably in the range of about 1 rpm to about 5 rpm, a large block tire has a grind speed in the range of about 1 rpm to about 20 rpm and preferably in the range of about 1 rpm to about 10 rpm; and a rib tire has a grind speed in the range of about 1 rpm to about 30 rpm and preferably in the range of about 10 rpm to about 20 rpm. The grind speeds are based on productivity and desirable appearance constraints for the tire.

The tire 10 is chucked up on the split rim and inflated whereafter the tire is rotated at a selected speed, preferably at about 100 rpm. The loadwheel 14 will advance against the tire wherein the tire is loaded to a predetermined load within about 2 revolutions. Thereafter the tire is rotated an additional 4 revolutions under the predetermined load.

The tire 10 is then tested for radial force variations wherein the magnitude of the radial force variations is detected and measured, preferably within 1 revolution whereafter the microprocessor will compare the magnitude of the radial force variations with a predetermined magnitude wherefrom the microprocessor will decide, within about 0.1 seconds, whether a grind is necessary and if a grind is required will output to the motor controller 58 to reduce the rotational speed of the tire. A signal will be sent to the means 20 to remove rubber from selected areas of the tire 10.

The electrical signals provided to the microprocessor 30 will include 360 data samples per revolution wherein each sample represents a separate measurement of the radial force variation at a different angle and in particular a measurement of the radial force variation at each degree increment of the tire which is specifically referenced to an angle location by the position encoder 53. The above described 360 samples per revolution are inputed into the microprocessor wherein a Fourier analysis calculation of a cyclic function is performed wherefrom the radial first harmonic peak to peak is calculated and a radial harmonic high point of force is calculated. The radial composite peak to peak force is calculated by comparison of the sequential radial force measurements obtained during the single revolution of a test.

The microprocessor 30 compares the radial harmonic peak to peak and radial composite peak to peak values calculated from a test cycle with a predetermined acceptable grindable range for each. If the radial harmonic peak to peak and the radial composite peak to peak are less than the acceptable range, no correction is needed. The tire is satisfactory and ready for use, and it is removed from the apparatus 8. If either or both the radial harmonic peak to peak and composite peak to peak exceed the acceptable range for each as determined by the scrap classifier 43 and the scrap limit potentiometer 44, the tire has radial force variations that cannot be corrected by grinding to bring the radial high point within the predetermined acceptable range. If the radial harmonic peak to peak and composite peak to peak fall within the acceptable grindable range of either or both without either exceeding the second limit, the procedure to reduce the radial force variations is preformed.

The microprocessor 30 also utilizes a grinder displacement angle which is the difference in degrees between the loadwheel 14 and the location of the grinders wherein the angle is generally about 107°. In addition to the grinder displacement angle, a fixed number of milliseconds prior to the grind is set which allows for the reduction of the speed of the rotating tire while the microprocessor receives the signal along line 5 from the position encoder 53. Also, a signal is sent from the microprocessor 30 along line G to the motor controller 58 which in turn will slow the motor 54 down to allow for the grinder to be located at the leading edge of the desired grind patch at the time the spindle speed is reduced to the desired grind speed.

A grind signal is outputed from the microprocessor 30 along the line D to a nodal point 32 wherein the signal is divided into two signals. Each of the signals passes through a servo amplifier 33, 34 wherein the signal is converted to a pneumatic signal which is passed through lines E, F to bring the two grinders 21, 22 into grinding engagement with the leading edge of the grind patch of the tire after the tire has slowed down to a predetermined speed. In a first mode of grinding, which may be termed "composite grinding", the grind patch consists of all parts of the tire corresponding to angles of the tire which contain force variation values greater than a constant value or a calculated limit which is a proportionate part of the measured peak to peak value of force variation which is generally termed a "suppressed limit". The tire is ground when the value of radial variation force difference when referenced to the radial soft spot is greater than the suppressed limit.

The microprocessor 30 is programmed to determine a grind patch which corresponds to minimum angle of the tire during grind. One means used to attain the minimum angle is to start at the calculated radial soft spot and compare sequential force variation with the suppressed limit as measured both in a clockwise and a counterclockwise direction from the soft spot. The total angle subtended before exceeding the suppressed limit in both directions is termed the non-grind portion of the tire. The remaining angular portion of the tires correspond to the desired grind patch which is normally 180° or less. Generally, the grind patch is longer as greater force removal is required. When the peak to peak radial force only exceeds the suppressed limit by 5 pounds, the grind patch may be as small as 20°.

Upon completion of grinding the grind patch, the grinder is disengaged from the tire, the microprocessor sends a signal to the motor controller 54 to speed up the rotating tire to the nongrind speed to about 100 rpm whereupon the tire is again tested for radial force variations and a determination as to any further grinding is made. If no further grinding is required, the rotating tire is stopped and the tire is ejected from the tire uniformity apparatus 8.

In an alternative method of grinding, generally termed "harmonic grind", the grind output for radial harmonic correction at any spindle speed is calculated which is based on the magnitude of the radial harmonic peak to peak force. The grind output determines a grind patch which is of equal length on both sides of the radial high point. The grind patch is less than or equal to 180° and in particular the grind patch has an angle of 20°, 40°, 60°, 80°, 100°, 120°, 140°, 160°, or 180° of the 360° of the tire.

Figure 2:
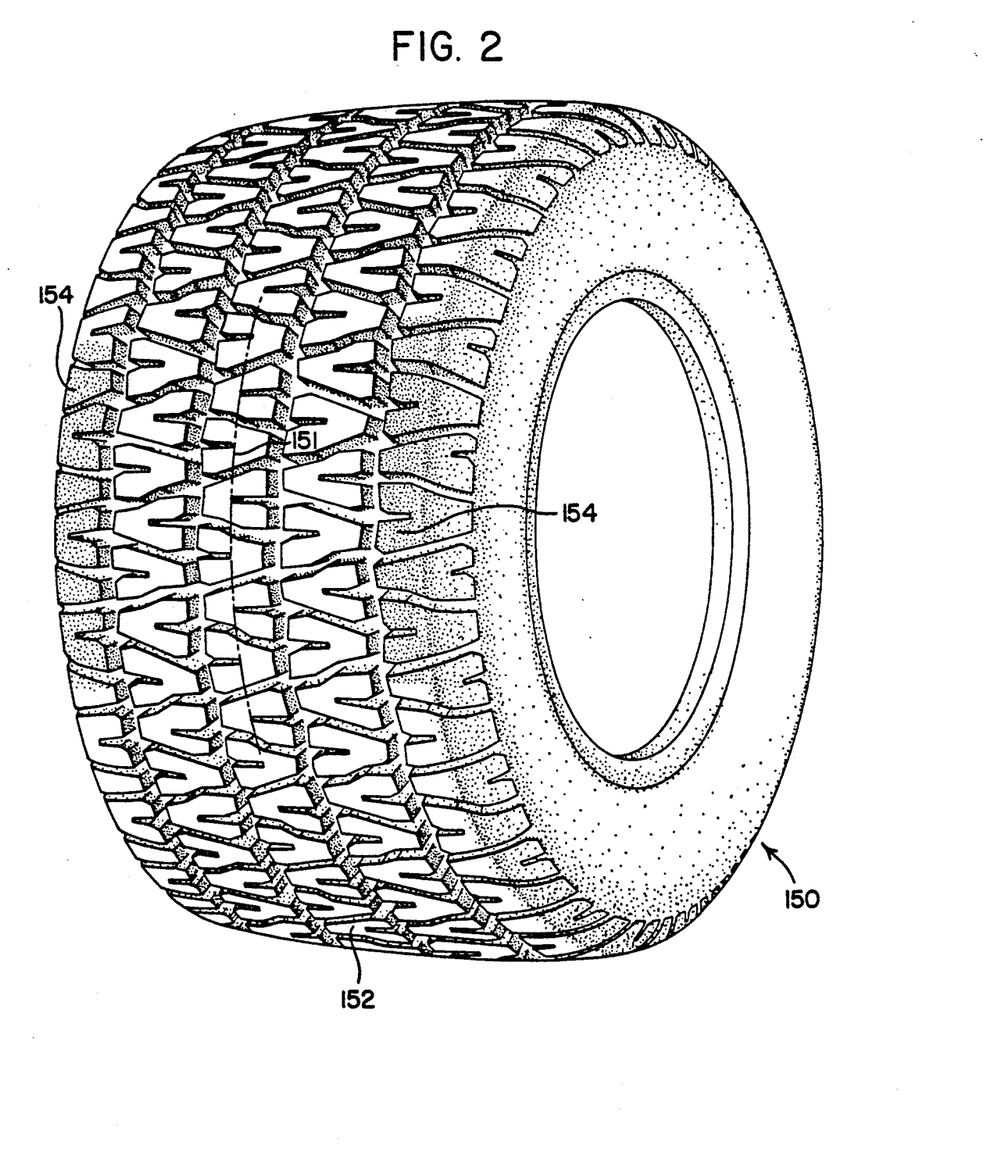
FIG. 2 is a depiction of a tire made in accordance with the instant invention.
Figure 3:
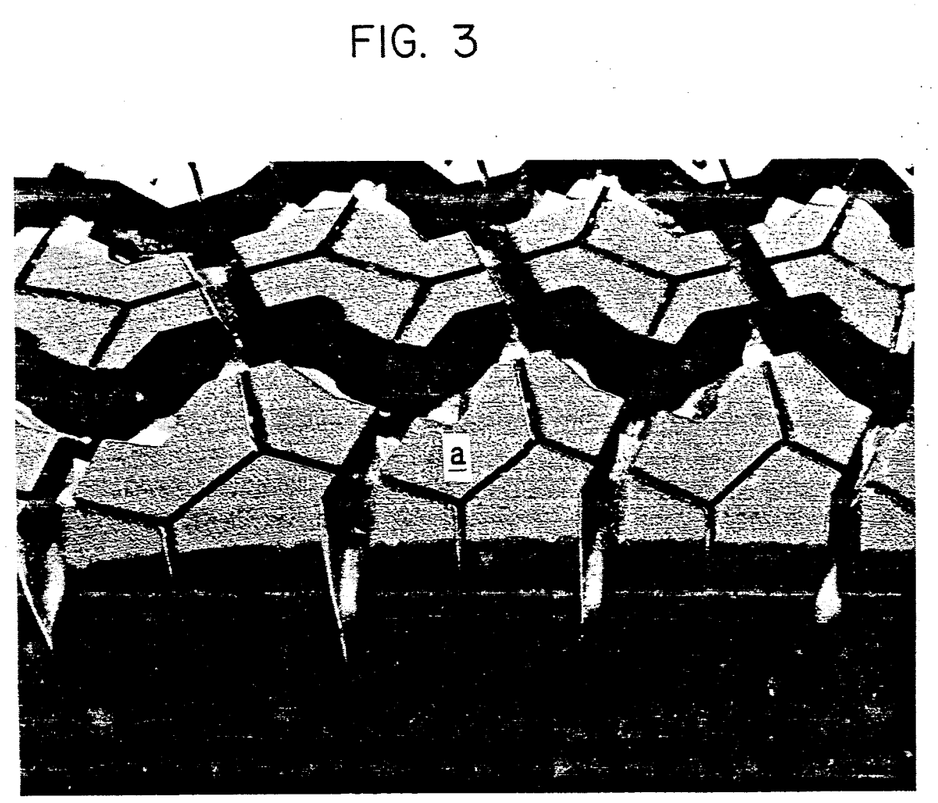
FIG. 3 is a photograph used as a maximum standard for visual inspection of ground tires.
Figure 4:
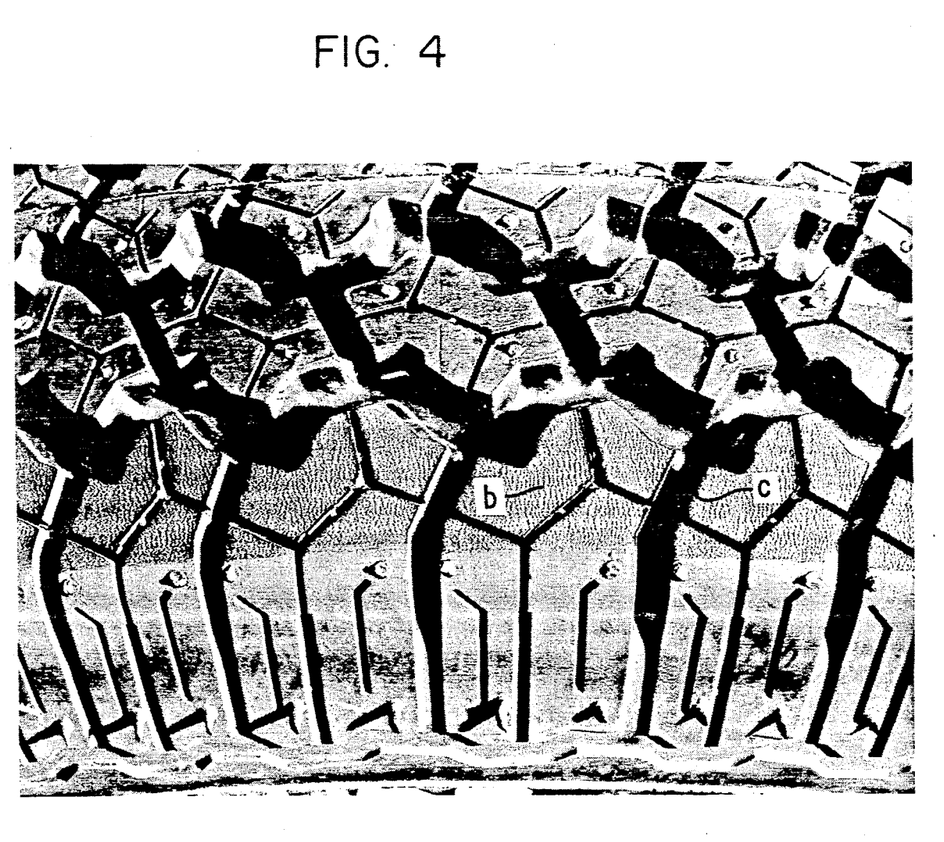
FIG. 4 is a photograph used as a maximum standard for visual inspection of ridges of ground tires.
Figure 5:
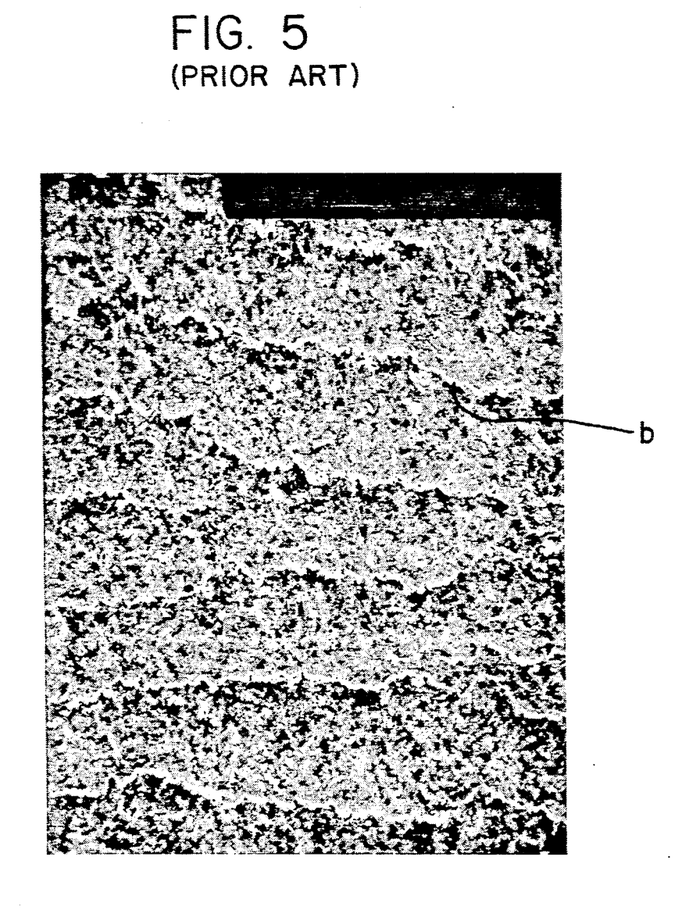
FIG. 5 is a photograph of the prior art showing a section of a ground surface of a conventionally ground tire wherein the section is magnified at 40 times.
Figure 11:
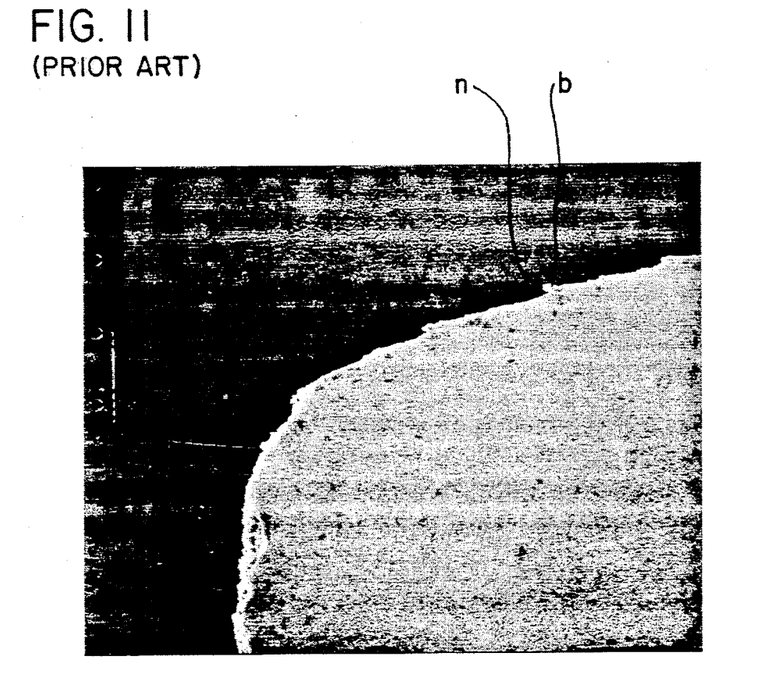
FIG. 11 is a photograph showing a cross section of a block type tread that was ground by prior art.

A tire 150 as shown in FIG. 2 resulting from the practice of the present invention includes a circumferential center line 151, a tread 152 which has a ground portion 154 characterized by the absence of ridges extending continuously across the perpendicular to the circumferential centerline of the tire. The appearance of the tire tread 152 is evaluated in terms of texture which is determined by visual inspection of the tire 150 by a person trained in such techniques. Generally, such a person is trained in comparison of the various pictures or tires of types of textures that may occur as shown in FIGS. 3 and 4. In particular, the person inspects for maximum grooved surface "a" as shown in FIG. 3 which can result from a flawed grinding stone or scalloping (ridges) "b" as shown in FIG. 4 and in FIG. 5 which is the result of the actual grinding. FIG. 5 is a magnification of 40 times of a ground surface with ridges wherein each ridge includes a raised lip on which can be characterized as generally extending continuously across the ground surface wherein the ridges are about perpendicular to the circumferential centerline 151 of a tire. Furthermore, each raised lip "b" generally has an undercut "n" as shown in FIG. 11 which is a photograph of a cut cross section, magnified by 40 times, of a ground tire which was rotating at 60 rpm during grinding. The absence of such ridges "b" diminishes the probability of reducing the tire to a blemish and for reprocessing the tire to meet predetermined visual criteria of texture.

Figure 6:
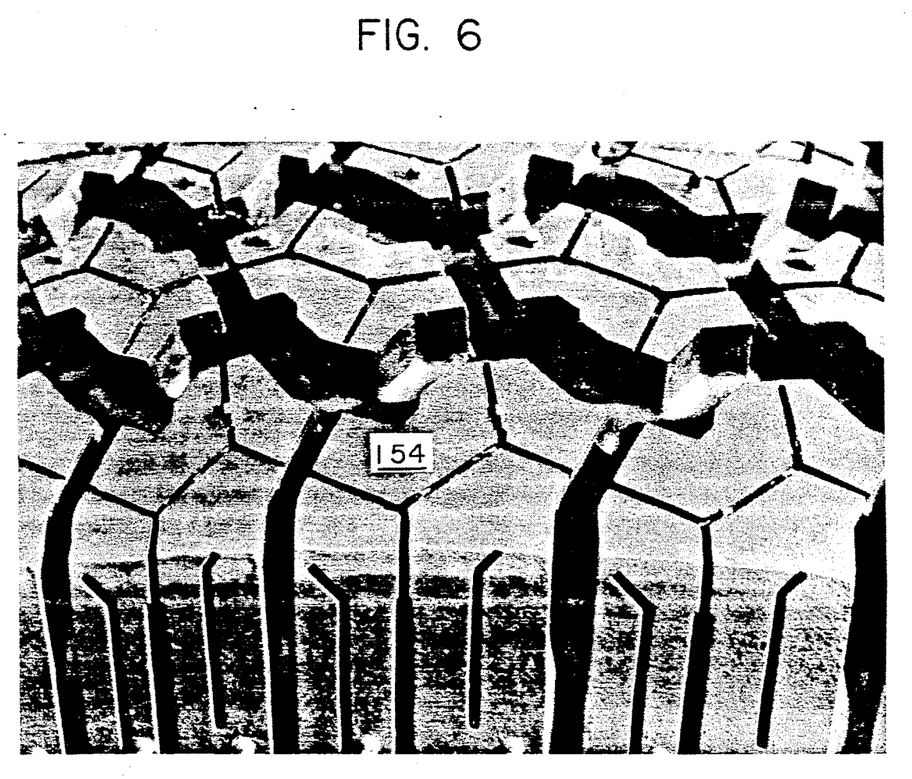
FIG. 6 is a photograph showing a section of a ground surface of a tire ground according to the present invention.
Figure 7:
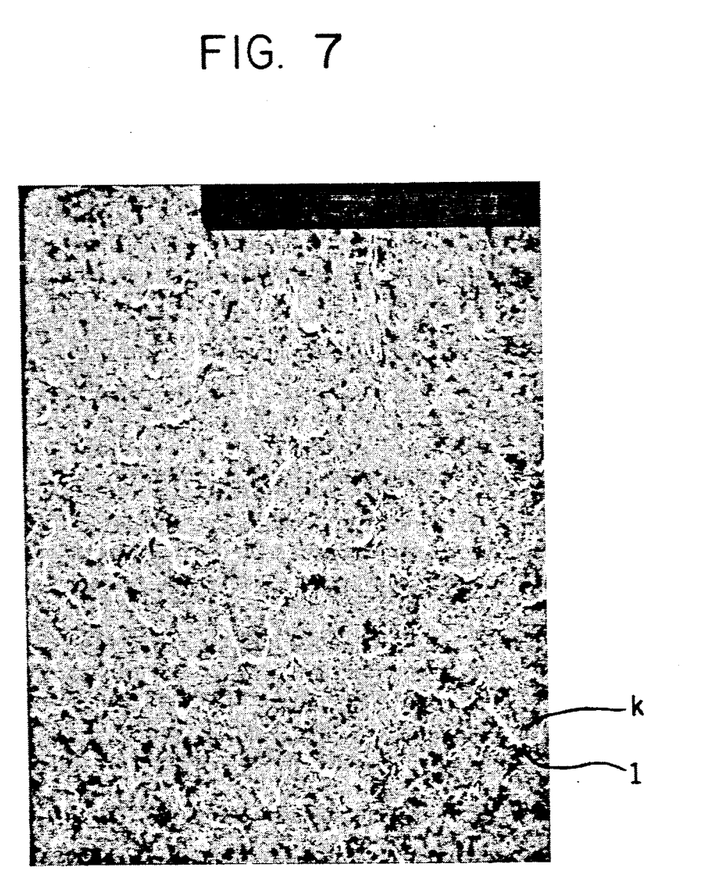
FIG. 7 is a photograph showing a section of a ground surface of a tire ground according to the present invention wherein the section is magnified at 40 times.
Figure 12:
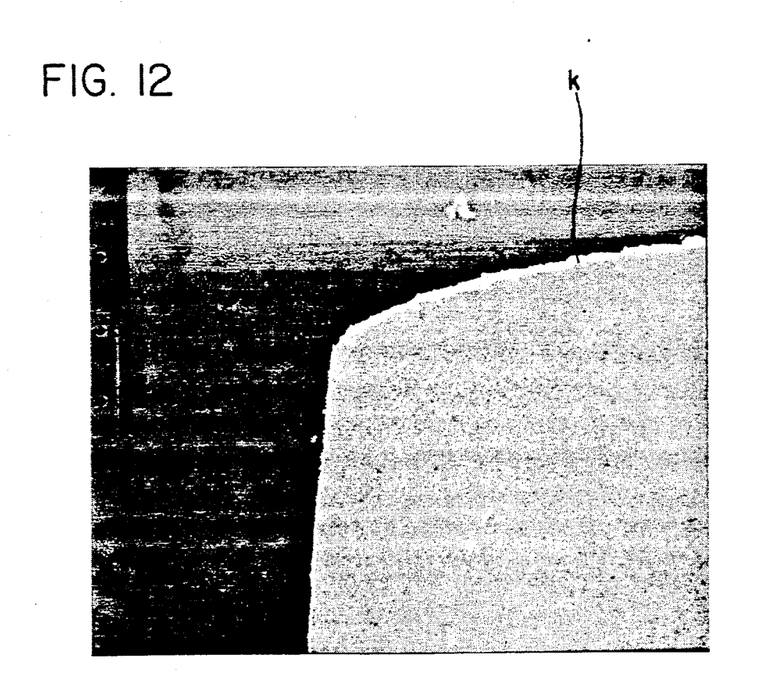
FIG. 12 is a photograph showing a cross section of a block type tread ground according to the present invention.

FIG. 6 is a photograph of a section of a tire with a ground portion 154 ground according to the present invention wherefrom FIG. 7 is a photograph of a magnified portion of the ground patch which has slow speed ground wherein the portion has been magnified 40× at 0° tilt using an electron microscope and FIG. 12 is a photograph of a cut cross section of the ground tire shown in FIG. 7. The texture of the ground patch 154 as shown in FIGS. 6 and 7 contains mounds "k" of rubber as shown in FIG. 7, each mound having an edge "l" which can be characterized as on at least one side of the mound and generally on 2 and 3 sides of each mound. Furthermore, most of the mounds can be generally characterized as being "U" shaped wherein the leading edge of each mound is unidirectional. The mounds generally have varying shapes and widths wherein the mounds are random and irregular on the ground portion of the tire. However, the mounds do not extend continuously across the face of the ground patch as found in the ridges of conventionally ground tires and, furthermore, FIG. 12 shows that the mounds "k" do not include lips with undercuts as found in the conventionally ground tires. Such mounds found in the grind patch of the present invention provide a texture more suitable to the visual criteria of inspection.

Another feature of a tire that is slow speed ground is the diminished reversion found on the surface of the grind patch. Reduction in reversion may indicate that the physical properties of the grind path have not been altered as found with conventional grinding of tires. The reduced reversion in the grind patch provides for more uniform physical properties of the tire tread.

Figure 8:
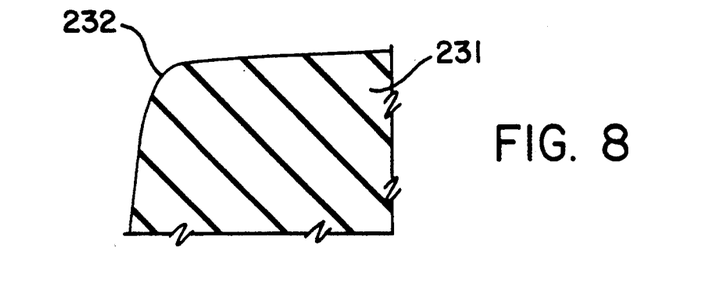
FIG. 8 shows the radius of curvature for a molded block of a tread.
Figure 9:
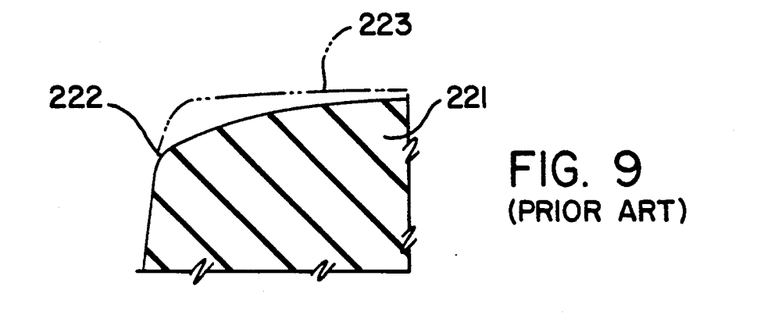
FIG. 9 shows prior art wherein the radius of curvature of a block for a conventionally ground tire is shown.
Figure 10:
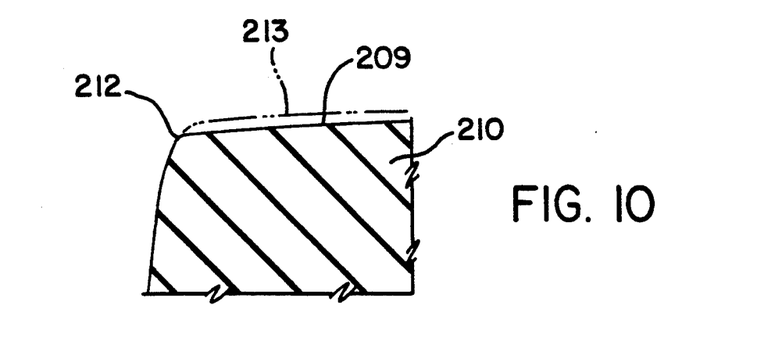
FIG. 10 shows the radius of curvature of a block of a ground tire according to the present invention.

Another feature of tires resulting from the practice of the present invention is shown in FIG. 10 wherein the ground portion 209 of a block type tread 210 is characterized by an edge 212 of the block having a radius of curvature which is less than the radius of curvature 222 found in the prior art of conventionally ground tires 221 as shown in FIG. 9. In particular, the leading edge 212 of a slow speed ground tire with a block type tread is substantially the same as the radius of curvature 232 of the edge of an unground molded block 231 which is shown in FIG. 8. In FIGS. 9 and 10, a phantom line 213, 223 represents the original configuration of the block.

It has been found that to reduce radial force variations using the slow speed ground process as described herein requires less than five grind passes to accomplish the desired radial force variation. More particularly, excessive radial force variations can be removed in two grind passes and it has been generally found excessive radial force variations can be removed in one grind pass.

Although the invention has been described in detail relative to a presently preferred embodiment, it is evident from the description that departures from and modifications to that description can be made within the scope of the invention measured by the claims.

I claim:

1. A tire uniformity correction apparatus comprising:
    means for detecting a radial force variation generated by a rotating tire;
    actuatable means for removing material from the outer periphery of the tire, said material removing means being actuatable as a function of the radial force detected by said detecting means; and
    means for limiting rotation of the tire to a speed no greater than about 30 revolutions per minute during actuation of said material removing means.

2. The apparatus of claim 1 wherein said means for limiting rotation of the tire comprises a drive means for rotating the tire between about 1 revolution per minute and the resonance speed of the tire.

3. The apparatus of claim 2 wherein said means for detecting a radial force variation detects the radial force variation during rotation of the tire in the range of about 30 revolutions per minute to about 200 revolutions per minute.

4. The apparatus of claim 2 wherein said drive means comprises a D.C. motor.

5. The apparatus of claim 2 wherein said drive means comprises a low inertia D.C. motor.

6. The apparatus of claim 2 further including controller means which controls the speed of said drive means.

7. The apparatus of claim 2 further including computer means for determining the magnitude and location of the radial force variation and for comparing said magnitude of the radial force variation to a predetermined magnitude.

8. The apparatus of claim 2 wherein said drive means rotates the tire between 1 revolution per minute and about 100 revolutions per minute and the radial force variation is detected during rotation of the tire between about 30 revolutions per minute to about 100 revolutions per minute.

9. The apparatus of claim 7 wherein said drive means comprises a variable speed A.C. motor.

10. The apparatus of claim 1 wherein said means for removing material from the tire comprises a grinder.

11. An apparatus for correcting a radial force variation in a tire, said apparatus comprising:
    means for rotating the tire against a load and about a longitudinal central axis of the tire;
    means for sensing a radial force variation in the tire during loaded rotation of the tire;
    means for generating an electrical signal as a function of the radial force variation sensed by said sensing means;
    means for comparing the electrical signal generated by said sensing means with a predetermined signal and for generating a control signal when the electrical signal exceeds the predetermined signal;
    actuatable means for removing material from the outer periphery of the tire;
    means for controlling said rotating means to limit the speed of rotation of the tire during a grind cycle to a speed no greater than thirty revolutions per minute; and
    means for actuating said material removing means during the grind cycle in response to the control signal.

12. The apparatus of claim 11 wherein said sensing means senses the radial force variation during rotation of the tire in the range of about 30 revolutions per minute to about 200 revolutions per minute.

13. The apparatus of claim 11 wherein said rotating means comprises a D.C. motor.

14. The apparatus of claim 11 wherein said rotating means comprises a low inertia D.C. motor.

15. The apparatus of claim 11 wherein said rotating means rotates the tire between 1 revolution per minute and about 100 revolutions per minute and the radial force variation is sensed by said sensing means during rotation of the tire in the range of about 30 revolutions per minute to about 100 revolutions per minute.

16. The apparatus of claim 11 wherein said rotating means comprises a variable speed A.C. motor.

17. The apparatus of claim 11 wherein said means for removing material from the tire comprises a grinder.

* * * * *